United States Patent
Sahoo et al.

(10) Patent No.: US 7,827,435 B2
(45) Date of Patent: Nov. 2, 2010

(54) METHOD FOR USING A PRIORITY QUEUE TO PERFORM JOB SCHEDULING ON A CLUSTER BASED ON NODE RANK AND PERFORMANCE

(75) Inventors: Ramendra K. Sahoo, Mohegan Lake, NY (US); Adam J. Oliner, Cheshire, CT (US)

(73) Assignee: International Business Machines Corporation, Armonk, NY (US)

( * ) Notice: Subject to any disclaimer, the term of this patent is extended or adjusted under 35 U.S.C. 154(b) by 1591 days.

(21) Appl. No.: 11/057,969

(22) Filed: Feb. 15, 2005

(65) Prior Publication Data

US 2006/0184939 A1    Aug. 17, 2006

(51) Int. Cl.
    *G06F 11/00*    (2006.01)
(52) U.S. Cl. ................................ 714/4; 718/103
(58) Field of Classification Search ............ 718/100, 718/102, 103, 104; 717/108, 151, 126; 714/1, 714/25, 47, 48
    See application file for complete search history.

(56) References Cited

U.S. PATENT DOCUMENTS

| | | | | |
|---|---|---|---|---|
| 5,694,594 | A * | 12/1997 | Chang | 707/6 |
| 5,889,989 | A * | 3/1999 | Robertazzi et al. | 718/105 |
| 6,067,545 | A * | 5/2000 | Wolff | 707/10 |
| 6,721,713 | B1 * | 4/2004 | Guheen et al. | 705/1 |
| 6,859,834 | B1 * | 2/2005 | Arora et al. | 709/227 |
| 2002/0144248 | A1 * | 10/2002 | Forbes et al. | 717/167 |
| 2004/0107125 | A1 * | 6/2004 | Guheen et al. | 705/7 |
| 2005/0165881 | A1 * | 7/2005 | Brooks et al. | 709/200 |
| 2005/0246569 | A1 * | 11/2005 | Ballew et al. | 714/4 |
| 2006/0106931 | A1 * | 5/2006 | Richoux | 709/226 |
| 2006/0112297 | A1 * | 5/2006 | Davidson | 714/2 |
| 2006/0117208 | A1 * | 6/2006 | Davidson | 714/4 |

OTHER PUBLICATIONS

Elie Krevat, Jose G. Castanos and Jose E. Moreira, "Job Scheduling for the BlueGene/L System," 2002.
A. J. Oliner, R. K. Sahoo, J.E. Moreira, et al., "Fault-aware Job Scheduling for BlueGene L/ Systems," 2004.
R. K. Sahoo, A.J. Oliner, M. Gupta, J.E. Moreira, "Critical Event Prediction for Proactive Management in Large-Scale Computer Clusters," 2003.

* cited by examiner

*Primary Examiner*—Dieu-Minh Le
(74) *Attorney, Agent, or Firm*—Michael J. Buchenhorner; Derek S. Jennings

(57) ABSTRACT

In a multi node information processing system, a method for scheduling jobs, includes steps of: determining node-related performance parameters for a plurality of nodes; determining a ranking for each node based on the node related performance parameters for each node; and ordering each nodes by its ranking for job scheduling.

1 Claim, 6 Drawing Sheets

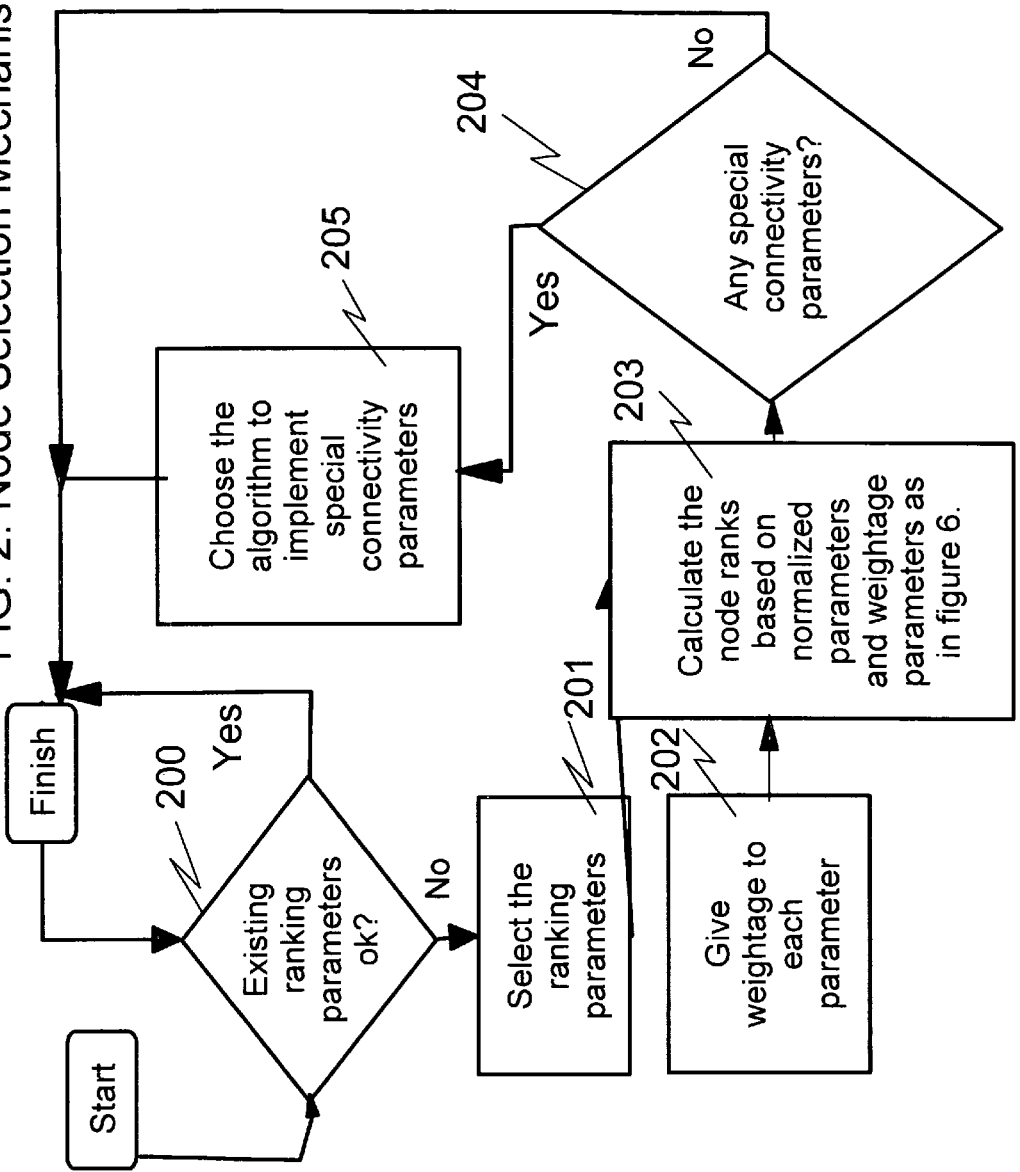
FIG. 2: Node Selection Mechanism

| Node ID | failure rate (N) | Cluster failure rate (N_av) | error rate (e) | Cluster error rate (e_av) | performance degradation rate (d) | Cluster performance degradation rate (d_av) | Probability of failure in next inter-failure time (Pf) |
|---|---|---|---|---|---|---|---|
| 3 | 1 failures per day | 7 failures per day | 70 per day | 165 per day | 59 per day | 342 per day | 0.5 |
| 10 | 0.56 failures per day | 7 failures per day | 37 per day | 165 per day | 67 per day | 342 per day | 0.7 |
| 45 | 0.346 failures per day | 7 failures per day | 43 per day | 165 per day | 34 per day | 342 per day | 0.48 |

301  302  303  304  305  306  307  308

Figure 3. Examples of Parameters for Node ranking (300)

| Node ID | Normalized mean failure rate value (Nf) Nf=(N)/(N_av) | Normalized mean failure inter-arrival time value (Nft) Nft=(ft_av)/(ft) | Normalized mean error rate value (Ne) Ne=(e)/(e_av) | Normalized mean error inter-arrival time value (Et) Et=(et_av)/(et) | Normalized mean performance degradation rate value (Nd) Nd=(d)/(d_av) | Normalized mean performance degradation inter-arrival time value (Ndt) Ndt=(dt_av)/(dt) |
|---|---|---|---|---|---|---|
| 3 | 1/7=0.142857 | 3.4286/24=0.142857 | 70/165=0.4242 | 0.14545/0.3429=0.4242 | 59/342=0.1725 | 0.0701/4068=0.1725 |
| 10 | 0.56/7=0.08 | 3.4286/42.857=0.08 | 37/165=0.22424 2 | 0.14545/0.6486=0.224242 | 67/342=0.1959 | 0.0701/3582=0.1959 |
| ... | ... | | | | | |
| 45 | 0.346/7=0.04943 | 3.4286/69.364=0.04943 | 43/165=0.260606 | 0.14545/0.558=0.260606 | 34/342=0.0994 | 0.0701/7058=0.0994 |
| 301 | 401 | 402 | 403 | 404 | 405 | 406 |

Figure 4. Calculating the normalized values (400)

| Normalized Node/system parameters | Nf | Nft | Ne | Et | Nd | Ndt | Pf |
|---|---|---|---|---|---|---|---|
| Weightage parameters | Wf(0.233 33) | Wft(0.0) | Wne(0.26 667) | Wet(0.0) | Wnd(0.1666 7) | Wndt(0.0) | Wpf(0.33 333) |
| 501 | 502 | 503 | 504 | 505 | 506 | 507 | 508 |

Figure 5. Weightage parameters for the node parameters (500)

| Node ID | Node Ranking calculation (R) | Node Rank |
|---|---|---|
| | Nfx Wf+Nftx Wft+Nex Wne+Etx Wet +Ndx Wnd+Ndtx Wndt+Pfx Wpf | R |
| 3 | 0.142857x0.23333+0.142857x0.0+0.4242x0. 26667+0.4242x0.0+0.1752x0.16667+0.175 2x0.0+0.5x0.33333 | 0.34446 |
| 10 | 0.08x0.23333+0.08x0.0+0.2242x0.26667+0. 2242x0.0+0.196x0.16667+0.196x0.0+0.7x0. 33333 | 0.31605 |
| 45 | 0.0494x0.23333+0.0494x0.0+0.2606x0.266 67+0.2606x0.0+0.099x0.16667+0.099x0.0+ 0.48x0.33333 | 0.25752 |

Figure 6. Calculating the node rankings (600)

METHOD FOR USING A PRIORITY QUEUE TO PERFORM JOB SCHEDULING ON A CLUSTER BASED ON NODE RANK AND PERFORMANCE

FIELD OF THE INVENTION

The invention disclosed broadly relates to the field of information processing methods and systems and more specifically to distributed, multinode data processing systems.

BACKGROUND OF THE INVENTION

Today networks or clusters of computers are used for all types of applications. In order for these clusters of computers to perform efficiently and to be utilized to their maximum capacity, it is important that not only the jobs scheduled for execution are scheduled efficiently, but also that in the order in which the nodes are picked up can finish the job in time. It is also desirable that the nodes are utilized optimally. If any individual computer (or processor) in the cluster unexpectedly fails, the effect on the job can be catastrophic and cascading. Similarly, if the jobs are not assigned by optimizing the computer job resource allocation, the jobs might run for several times longer than the usual running time. Given the speed of modern business and the importance of computer cluster job assignment, every small amount of job execution delay and machine down time can prove to be extremely costly. Therefore, it would be advantageous to be able to not only optimize the job scheduling so that the job can be finished in minimum possible time, but also to maximize the processor utilization, keeping an eye on minimum down time for the individual computers.

A generalized scheduler for a cluster of computers should allow to have co-scheduling (simultaneously scheduling multiple jobs into one or more number of computer nodes), process migration and backfilling mechanisms assuming there are no failures. However, through the introduction of intelligent prediction for optimum process migration and check-pointing, a number of interesting components can be included within the scheduling domain to make the automatic fault prediction, job queuing and migration process more effective. For example: a) Job migration is no longer needed to improve the job performance, but may still have value as a way to move jobs away from predicted failures or to reduce temporal fragmentation (splitting a job or multiple jobs with respect to time), b) The scheduler can select nodes on an individual basis, as opposed to picking an entire partition (a partition is a set of nodes that satisfies the job running requirements) c) A node with one or more running jobs is not necessarily excluded as a possible node for subsequent job submission.

Current job scheduling procedure for any type of large-scale computer clusters consider the nodes only based on their availability (or whether busy processing other jobs). There is no mechanism or method to consider the rank of nodes in terms of providing best job performance and/or node utilization. There is a need for a new method to include the node rank criteria while selecting the nodes to submit the jobs which would significantly improve the job performance including the processor or node utilization.

Current job scheduling procedures provide no knowledge about the behavior of the nodes when a job runs. Further, there is uncertainty as to whether a node will fail while a job is running, experience too many errors, or experience performance degradation. Thus, without knowledge of the behavior of the nodes, more redundant nodes must be provided to account for any such failures, errors or performance degradation. For example, if a customer needs a specific job, such as weather forecasting to be completed within a specified time, lack of knowledge of the behavior of the nodes forces the supplier of the nodes to provide redundant nodes to ensure that the customer needs are satisfied. Therefore, there is a need to determine or predict the behavior of nodes to improve the overall utilization of the nodes and thereby reduce the need for redundancy node provision.

A currently pending patent application Ser. No. 10/720,300, assigned to the same assignee as that of the instant application and which is hereby incorporated by reference, discloses a failure prediction mechanism for determining the probability of the occurrence of failure of the nodes. This determination is then used in the maintenance of the nodes, such as determining when to repair or replace a node that has a failure rate above a threshold.

Previously, the failure prediction was envisioned as an algorithm, or function. A known prediction mechanism accepts a node or partition and a time window, and returns predictions (either Boolean or as a probability) about whether there is a possibility that the node would succeed to complete the job or fail.

Learning to recognize rare events is a difficult task. The difficulty may stem from several sources: few examples support the target class; events are described by categorical features that display uneven inter-arrival times; and time recordings only approximate the true arrival times, such as occurs in computer-network logs, transaction logs, speech signals, etc. Therefore there is a need for a system and method for scheduling jobs among a plurality of nodes that overcomes the above-discussed shortcomings.

SUMMARY OF THE INVENTION

We overcome the above-discussed shortcomings, by using a predictor with the following internal state: a "stack" of nodes, where the top nodes were the best ones on which to schedule a job, and those furthest down on the stack are relatively the worse cases. As new data arrives at the scheduler, it can rearrange these nodes up or down in the stack.

BRIEF DESCRIPTION OF THE DRAWINGS

FIG. 2 illustrates a node selection mechanism according to an embodiment of the invention.

FIG. 3 shows examples of parameters for node ranking.

FIG. 4 is a table showing calculation of normalized values.

FIG. 5 is a table showing weightage parameters for the node parameters.

FIG. 6 is a table showing calculation of node rankings.

DETAILED DESCRIPTION

Figure 1:
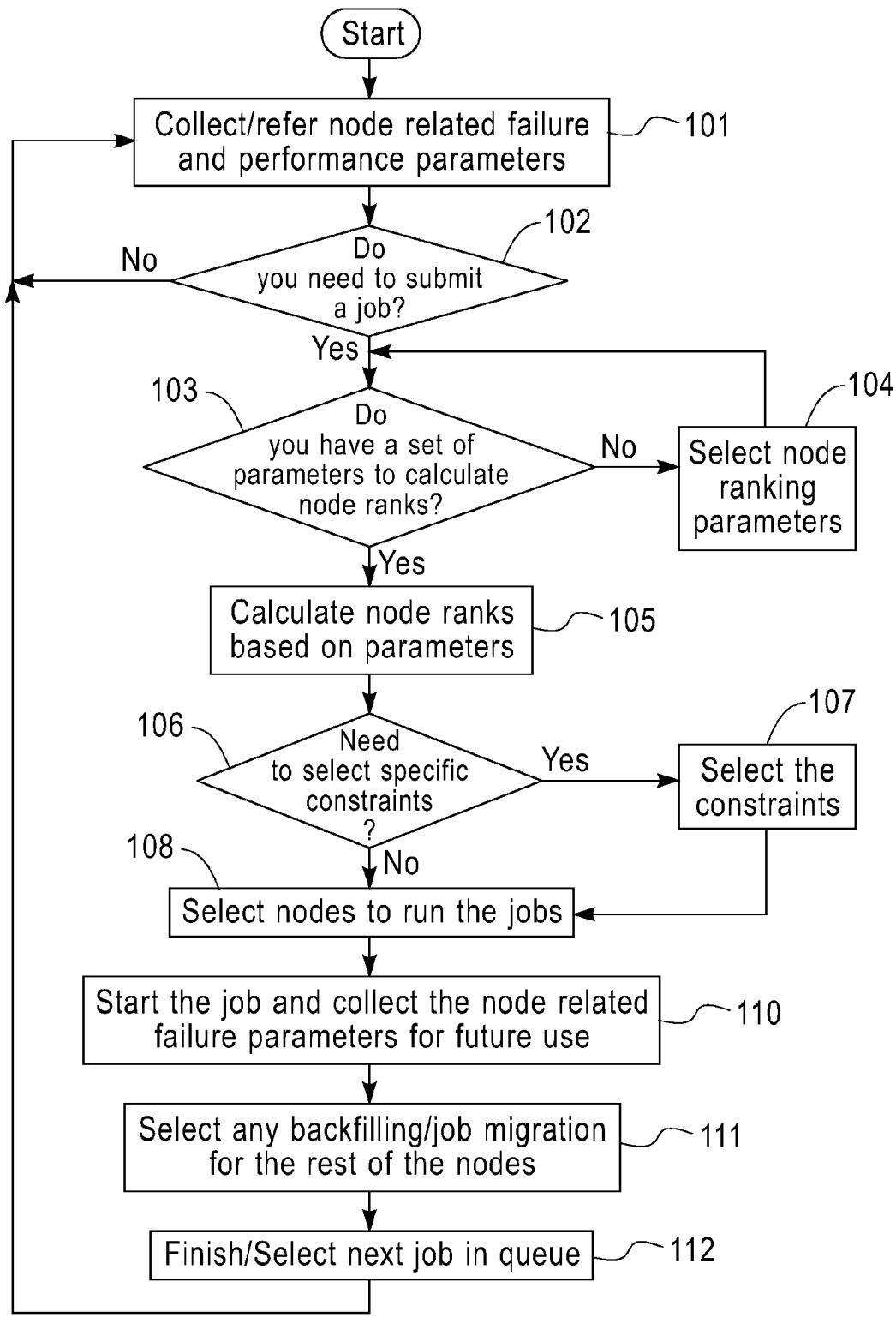
FIG. 1 is an overall flow chart illustrating a method for scheduling jobs according to an embodiment of the invention.

We first discuss the operation of a system according to an embodiment of the invention. Once a series of computers are in operation, standard event logging/tracing facilities start collecting the reliability, availability and serviceability (RAS) related performance parameters (RAS parameters at least include the system down time, inter-arrival of the processor/node down time, temporary/intermittent problems on the system and how much they affect the running jobs or the network connectivity, processor utilizations in terms of capacity and the like).

Based on the failures and errors happening in these nodes, parameters such as mean failures rates (N), mean error rates (e), mean performance degradation rates (d), etc can be calculated for each of the nodes (the rate can be number of failures, errors or degradation per day, per hour) by dividing cluster number of failures or errors or other parameters by cluster time duration. (discussed in detail in FIG. 3).

Similarly, the mean failure rates (N_av), mean error rates (e_av), mean performance degradation rates (d_av) can be calculated for the system wide operation by dividing cluster number of failures, cluster number of errors, cluster number of performance degradations happening within whole cluster by cluster time duration.

For each of the nodes, at any instant of time, we can calculate a probability of occurrences of failures or errors (Pf) within a specified time-window using associative rule mining and machine-learning based algorithms discussed in Sahoo, Oliner, Rish, Gupta, Sivasubramaniam and Vilalta "*Critical Event Prediction for Proactive Management in Large-Scale Computer Clusters*", Knowledge Discovery and Data Mining Conference, Washington, D.C. (2003), pages 426-435.

A number of parameters such as mean inter-failure time (ft), mean inter-error time (et), mean performance degradation arrival rate (dt) for each of the nodes, and cluster can also be calculated by summing the total number of inter-arrival time intervals (for failures, errors or performance degradations) and dividing the sum by cluster number of failures, errors or performance degradations for either individual nodes or cluster respectively.

The failure rate parameters, error rate parameters and performance degradation parameters and probability of occurrence of failures within a specified time window can be normalized to calculated normalized mean failure rate value (Nf), normalized mean error rate value (Ne), normalized mean performance degradation value (Nd) for each of the nodes using the formula $Nf=N/(N\_av)$, $Ne=e/(e\_av)$ and $Nd=d/(d\_av)$ respectively. Similarly, normalized mean failure inter-arrival time value (Nft), normalized mean error inter-arrival time value (Et) and normalized mean performance degradation inter-arrival time value (Ndt) can also be calculated using the formula: $Nft=(ft\_av)/(ft)$, $Ne=(e\_av)/(e)$ and $Ndt=(dt\_av)/(dt)$, respectively, where $ft=1/N$, $ft\_av=1/(N\_av)$, $et=1/e$, $et\_av=1/(e\_av)$, $dt=1/d$ and $dt\_av=1/(d\_av)$. Parameters ft, et and dt correspond to nodewise mean failure inter-arrival time value, mean error inter-arrival time value and mean performance degradation inter-arrival time value respectively. Similarly parameters ft_av, et_av and dt_av correspond to system wide mean failure inter-arrival time value, mean error inter-arrival time value and mean performance degradation inter-arrival time value respectively.

A normalized weight value can be chosen for each of the parameters considered above to vary the influence of each of these parameters as and when required. The weight parameters for Nf, Nft, Ne, Et, Nd, Ndt and Pf are Wf, Wft, Wne, Wet, Wnd, Wndt and Wpf respectively.

We consider weights (Wf, Wft, Wne, Wet, Wnd, Wndt and Wpf) to make the influential parameters to be chosen by the system administrator either picking up at least one of them or all of them or a combination of a selected ones. The selection of the parameters are based on the distribution characteristics of the normalized parameters.

The weightage parameters are chosen based on ordering the influence of each of the rank parameters (Nf, Nft, Ne, Et, Nd, Ndt and Pf) and normalizing the rank in terms of a fraction of total sum equating to 1. More details of weightage calculations are discussed with respect to FIG. 5.

Since Nf and Nft, Ne and Et, Nd and Ndt represent the same values in either raw form or derived form respectively, either of the raw value set (Nf, Ne, Nd) or the derived value set (Nft, Et, Ndt) can be chosen for final node ranking (R) calculations. Hence, the weightage parameters for either raw set or derived set can be set to zero while calculating the final R value for each of the nodes.

At any instant of time these parameters (or normalized weight values) can be considered with proper weightage to finally calculate the node rank (R) through a linear combination formula discussed later with respect to FIG. 6.

Once the node rank (R) is calculated for each of the nodes, a job "X" which is required to be submitted into N number of nodes, should be submitted to those N number of nodes which have lowest "R" values.

The time at which the ranking of the nodes can be done is dependent on the job size to be run on the system, job running duration etc. These values are provided by job assigner. See Elie Krevat, Jose G. Castanos, Jose E. Moreira, *Job Scheduling for the BlueGene/L System*. JSSPP 2002 at pp. 38-54

The assignment of the jobs can be done to all the best nodes from the node rank list at the instant of job launching. In case the nodes are of different capacity or same capacity nodes having different contradicting performance or failure measures a slight change in weighted parameters can be done to resolve between two same ranking nodes.

Even after considering the weighted normalization if still different nodes have same ranks, then same ranking the nodes will get equal preference while assigning jobs.

The node ranks will change significantly if there are occurrences of at least some of the following events between two consecutive ranking calculations for the nodes: (1) failure of nodes; (2) service maintenance of the nodes D; (3) some new nodes are added or deleted from the node list E.; or (4) there is a requirement to change in "weightage" parameters to give more weightage to a parameter different from earlier consideration.

The assigning of jobs is normally done in terms of first-come-first-serve (FCFS) as is normally done in case of any job scheduling. According to a known scheduling scheme used in a torus configuration of processors, for FCFS, we adopt the heuristic of traversing the waiting queue in order and scheduling each job in a way that maximizes the largest free rectangular partition remaining in the torus. For each job of size p, we try all the possible rectangular shapes of size p that fit in the torus. For each shape, we try all the legal allocations in the torus that do not conflict with running jobs. Finally, we select the shape and allocation that results in the maximal largest free rectangular partition remaining after allocation of this job. We stop when we find the first job in the queue that cannot be scheduled. See Krevat, Castanos, Moreira "*Job Scheduling for the BlueGene/L System*", JSSPP 2002: 38-54.

In case of any clusters, the ranking of nodes at any instant of time can be done with a time complexity of 0(n) or worst case 0(nlogn) (if multiple criteria are considered for ranking). As an example we apply the above technique to BlueGene/L type of clusters. BlueGene/L is a next-generation massively-parallel computing system designed for research and development in computational science. BlueGene/L is targeted at delivering hundreds of teraflops to selected applications of interest to the Advanced Simulation and Computing Initiative Program (ASCII).

In case of BlueGene/L each of the 65536 nodes have the same computing power. However, there are additional constraints in terms of assigning jobs to a set of nodes. The constraint is based on network connectivity of BG/L nodes.

In terms of job performance the jobs must be scheduled only to a set of nodes which have a geometrically rectangular connectivity. According to a known scheduling scheme, the node list to be picked up from a node table would have to have this additional constraint. In most toroidal systems, including BG/L, job partitions must be both rectangular (in a multidimensional sense) and contiguous.

There are a number of algorithms available to minimize the computation to pick up a node list based on BG/L constraints. The algorithm proposed in reference 1 has a time complexity of O(n^5). According to an embodiment of the invention, a new algorithm which has an asymptotic time complexity of O(n^3) including managing the node failure criteria as mentioned above. Hence the above method can provide a way to maximize the job running performance including minimizing the failure of jobs and indirectly minimizing the requirement of redundant hardware and checkpointing of jobs.

We now describe the overall working of a job-scheduling method 100 based on node failure/error or rank criterion according to an embodiment of the invention in reference to FIG. 1. In step 101 we collect and refer node related failure and performance parameters. Step 101 refers to related failures (e.g., node "n001" not available), performance problems (e.g., adapter "A001" performance has degraded) or errors (e.g., link error) reported through standard event logging or any other event logging mechanism described. See Sahoo, Oliner, Rish, Gupta, Moreira, Sivasubramaniam, Vilalta "*Critical Event Prediction for Proactive Management in Large-Scale Computer Clusters*", Knowledge Discovery and Data Mining Conference, Washington, D.C. (2003), pages 426-435.

In step 102 we determine whether a job is to be submitted or scheduled. Step 102 activates or triggers to start or stop a node failure/error/performance based criterion to prepare node ranking when a job needs to be submitted. The same criterion can include any checkpointing constraints from the user. In step 103 we determine whether there exists (e.g., in memory) a set of parameters for calculating node rankings. More details of the parameters are discussed in FIGS. 3, 4, and 5. This step also checks whether the existing parameters need or need not be changed depending on the node rank or availability etc. that might have changed in course of time. (e.g., if all the bad nodes are being taken care by a node replacement, then the failure related bad nodes can be neglected during node ranking). Steps 104 and 105 take care of the changes required to rectify or introduce any parameters for node ranking.

Step 106 handles any extra network or connection topology based constraints required to be satisfied over and above the generated event logging information while ranking or ordering the nodes. In step 107 the system selects any specific constraints determined to be necessary in step 106. Step 108 selects the best set of nodes to which the job will be submitted for running.

Step 110 covers running of jobs on the chosen set of nodes and reporting any events happening on the nodes to the event logger for future preparation of node ranking. Step 111 takes care of any job ordering procedure for job scheduling. If there are changes in job scheduling criteria (either first-come-first-serve or based on job priority, backfilling, migration or the like) are taken into consideration after the initial job has been submitted.

Step 111 considers the next job into one of the modified procedures for subsequent node ranking and/or job placement including making sure that the submitted job has finished and the engaged set of nodes are being released for future job runs. Finally, in step 112 the process finishes for the subject job and the next job in the queue is selected for processing.

An embodiment of our strategy for predicting rare or target events comprises the following steps: (1) finding all event types frequently preceding target events within a fixed time window; (2) validating event types that uniquely characterize target events, and do not occur often far from the time arrival of target events; and (3) combining validated event types to build a probabilistic rule-based system for prediction.

FIG. 2 describes the working of a node selection mechanism expanding steps 105, 106, 107, and 108 of FIG. 1. Step 200 determines whether there is a requirement to change or notify any of the node ranking parameters described in FIG. 3. Steps 201, 202 and 203 determine whether to add or delete any of the ranking parameters described in FIG. 3. Steps 204 and 205 take into account any special topology or connectivity constraints (for example, the torus constraints for the BlueGene/L supercomputer) to implement these special connectivity parameters.

FIG. 3 is a table 300 showing the details of the node ranking parameters and how these parameters are calculated from the number of failures, errors, and performance degradations. Assuming a cluster of 21 failures, 495 errors and 1026 performance degradations, mean failure rate, mean error rate and mean performance degradation rate for the cluster would have values 7 (column 303), 165 (column 305), and 342 (column 307) respectively. Similarly assuming failures rates, error rates and performance degradation rates for individual nodes each of the parameters in (column 302), (column 304) and (column 306) can be calculated. For example if node 3 has a total number of failures, errors and performance degradations with values 3, 210, 177 would result N=1 failure per day (column 302), e=70 errors per day (column 304) and d=59 performance degradations per day (column 306) respectively.

Referring to FIG. 4, calculation of other derived parameters such as mean failure inter-arrival time (ft, ft_av) (402), mean error inter-arrival time (et, et_av) (404), mean performance degradation inter-arrival time (dt, dt av) (406) for all the nodes as well as for the whole system can be done based on traces available from computers.

Traces are available in software operating environments to track failures, errors and performance measures of the nodes or their respective cluster. The results of such traces are illustrated in FIG. 3. For example, for node 3 of column 301, the mean failure rate of one failure per day is shown in column 302. The cluster failure rate of seven failures per day for the cluster is shown in Column 303. Column 304 shows that node 3 experiences 70 errors per day, while column 305 shows the cluster experiences 165 errors per day. Performance degradation for each node in the cluster is shown in Column 306. For example, Node 3 on a daily basis has 59 components which have experienced degradation in performance. Column 307 indicates that 342 components in the cluster have shown degradation in performance on a daily basis. Column 308 indicates the probability of the failure of the corresponding node in a given time interval. For example, node 3 has a probability of failure of the next identified time interval.

Proper weightage for each of the parameters used in FIG. 6 are described in FIG. 5. The total of the weightage values must be equal to 1. The normalized value calculations for each of the parameters (300) and Node rank value (602) as described in FIGS. 4 and 6 respectively.

FIG. 3 includes a list of node ranking parameter examples and how the parameters like failure rate 302, cluster failure rate 303, mean error rate 303, performance degradation 306 are considered in the context of node ranking.

At any instant of time nodes can be ordered based on the node rank (either considering failure frequency col. 302, col. 303 or number of temporary intermittent failures (col. 304, col. 305 happening on the system or both) or performance parameters col. 306, col. 307 network connectivity, processor utilization, bandwidth etc) or all taken into account together.

FIG. 4 is a table that shows the calculations of the normalized values (400). It describes the normalization of the failure (col. 401), error (col. 403) and performance (col. 405) parameters including the formulae. The normalization of the parameters (N, ft, e, et, d and dt) for each of the nodes (col. 301) is done by manipulating individual node parameters (N, ft, e, et, d and dt) by total number of cluster wide parameters ((N_av, ft_av, e, et, d and dt) through the formula N/(N_av), (ft av)/ft, e/(e_av), (et_av)/et, d/(d_av) and (dt_av)/dt respectively for each of the nodes considered in (col. 301).

FIG. 5 lists the various weightage parameters considered for the parameters. Note that since raw parameters (col. 401, col. 403, and col. 405) and derived parameters (cols. 402, 404, and 406) are based on the same set of failure rate, error rate and performance rate values, the weightage parameters (in FIG. 5) for raw parameters are non-zero (502, 504, 506), while weightage parameters for derived parameters (see FIG. 5, cols. 503, 505, and 507) are considered to be zero. The weightage parameters are based on the ranking and normalizing the rank of the parameters considered in FIG. 3. For example if we give values (3.5, 4, 2.5 and 5) to each of the parameters concerning failure (cols. 302 or 401), error (cols. 304 or 403), performance degradation (cols. 306 or 405) and Probability of failure occurrence in a specified time window (col. 308) respectively, the normalized weightage value for failure (Nf), error (Ne), performance degradation (Nd), and probability of failure (Pf) would be (3.5/15=0.2333) (col. 502), (4/15=0.26667) (col. 504), (2.5/15=0.16667) (col. 506) and (5/15=0.33333) (col. 508) respectively. We consider the weightage of (Nft, Net, Ndt) as zeros, since these are derived parameters from Nf, Ne and Nd respectively.

In FIG. 6, a table 600 lists final node ranking calculations based on the weightage parameters of FIG. 5 and normalized parameters of FIG. 4. The formula used to calculate the rank (R) of the nodes is a linear combination of the normalized parameters in FIG. 4 multiplied by the weightage parameters in FIG. 5. The rank of the three nodes with node Ids (col. 301) are 0.34446, 0.31605 and 0.25752 respectively. Hence node ordering in terms of rank from best node to worst nodes are node ID 45, node ID 10 and node ID 3 respectively.

FIG. 6 lists the formulae and numerical values (examples) based on the parameters in FIGS. 3 and 4. The node rank R (col. 602) signifies the rank of node based on the parameters like failures, errors and performances. Based on the values, the node ordering in terms of rank from best node to worst nodes are node ID 45, node ID 10 and node ID 3 respectively. The node ranking can also be done by simply considering individual parameters like Nf, Ne, Nd and Pf considered in FIG. 4.

Once the nodes are ranked according to node Rank (R) value, the R values basically indirectly represent the availability of the nodes and how good the nodes are to run a job or a set of jobs. For example if we need to run job "X" on two nodes we will pickup nodes with node Ids 45 and 10. If we would like to add job running capacity of the nodes it can also be added as a parameter into FIG. 3, followed by normalized job running capacity to FIG. 4 and a weightage parameter in FIG. 5 and finally contributing to node rank R.

Therefore, while there has been described what is presently considered to be the preferred embodiment, it will be understood by those skilled in the art that other modifications can be made within the spirit of the invention.

We claim:

1. In an information processing system comprising at least one cluster, the cluster comprising a plurality of processing nodes, a method for scheduling jobs among the processing nodes, comprising steps of:

collecting node related failure and performance parameters for each of the plurality of processing nodes, the node related failure parameters comprising at least one of: an error rate and a failure rate for each processing node; the node related performance parameters comprising at least one of: network connectivity, processor utilization, and bandwidth; wherein the collecting is performed by manipulating individual node parameters by a total number of cluster wide parameters;

determining whether a job must be submitted or scheduled before triggering a node ranking;

selecting node ranking parameters from the node related failure and performance parameters for the plurality of processing nodes;

determining if any existing node ranking parameters need to be changed;

determining whether there exist any topology constraints and choosing an algorithm to implement said topology constraints when they exist;

assigning a weight value to each node ranking parameter to derive weighted node ranking parameters, wherein a total value of the weight values is equal to one;

calculating node rankings based on the weighted node ranking parameters, wherein the node rankings indicate an ability of each processing node to execute a job in an efficient manner;

ordering the processing nodes based on the node rankings, from highest ability to lowest ability;

scheduling the jobs among the processing nodes according to the ordering of the processing nodes, wherein scheduling the jobs comprises assigning the jobs to the processing nodes with the highest ability to run said jobs;

reporting any events happening on the processing nodes to an event logger for future preparation of node rankings;

selecting any backfilling and job migration for the processing nodes not selected; and re-calculating the node rankings if necessary, wherein the node rankings are re-calculated based on at least one selected from a group consisting of: failure of the processing node, service maintenance of the node, new processing node added, processing node deleted, and change in the weight assigned to the node ranking parameter.

* * * * *